US008251042B2

(12) United States Patent
Ito

(10) Patent No.: US 8,251,042 B2
(45) Date of Patent: Aug. 28, 2012

(54) CONTROL UNIT AND CONTROL METHOD FOR TORQUE-DEMAND-TYPE INTERNAL COMBUSTION ENGINE

(75) Inventor: Masahiro Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 356 days.

(21) Appl. No.: 12/449,718

(22) PCT Filed: Mar. 18, 2008

(86) PCT No.: PCT/IB2008/000632
§ 371 (c)(1),
(2), (4) Date: Aug. 24, 2009

(87) PCT Pub. No.: WO2008/114118
PCT Pub. Date: Sep. 25, 2008

(65) Prior Publication Data
US 2010/0175663 A1    Jul. 15, 2010

(30) Foreign Application Priority Data

Mar. 19, 2007  (JP) .................................. 2007-070638

(51) Int. Cl.
*F02P 5/15* (2006.01)
*F02M 3/00* (2006.01)
(52) U.S. Cl. ................................. 123/339.11; 123/339.1
(58) Field of Classification Search .............. 123/406.23, 123/406.45, 406.47, 325, 481, 493, 198 DB; 701/101, 102, 103, 104, 105, 110, 112
See application file for complete search history.

(56) References Cited

U.S. PATENT DOCUMENTS

| 4,257,363 A | * | 3/1981 | Zeller .................. 123/406.5 |
| 4,337,512 A | * | 6/1982 | Furuhashi .................. 701/112 |
| 4,539,643 A | * | 9/1985 | Suzuki et al. .............. 701/112 |

(Continued)

FOREIGN PATENT DOCUMENTS

DE    27 38 886 A1    3/1979

(Continued)

OTHER PUBLICATIONS

Report of Result of Reconsideration Before Appeal dated Oct. 9, 2009 for corresponding Japanese Patent Application No. 2007-070638 (with translation).

(Continued)

*Primary Examiner* — Stephen K Cronin
*Assistant Examiner* — Sherman Manley
(74) *Attorney, Agent, or Firm* — Oliff & Berridge, PLC

(57) ABSTRACT

When a fuel-supply cutoff condition is satisfied, an ECU executes a program including: calculating the target torque; detecting the engine speed NE; calculating the target KL based on the target torque, NE and MBT; controlling an engine using the throttle valve opening amount based on the target KL, the base fuel ignition timing, and the fuel injection amount based on the current KL until the target KL becomes equal to or lower than the KL lower limit; controlling the engine using the throttle valve opening amount based on the KL lower limit, NE, the target ignition timing calculated based on the current KL and the target torque, and the fuel injection amount based on the current KL when the target KL reaches the KL lower limit; and actually starting a fuel-supply cutoff when the target ignition timing reaches the retardation limit timing.

22 Claims, 11 Drawing Sheets

U.S. PATENT DOCUMENTS

| | | | | |
|---|---|---|---|---|
| 4,543,634 A | * | 9/1985 | Kobayashi et al. | 701/110 |
| 4,730,587 A | * | 3/1988 | Norota et al. | 123/306 |
| 4,982,710 A | * | 1/1991 | Ohta et al. | 123/399 |
| 5,003,950 A | * | 4/1991 | Kato et al. | 123/406.46 |
| 5,065,716 A | * | 11/1991 | Nakagawa et al. | 123/326 |
| 5,069,184 A | * | 12/1991 | Kato et al. | 123/406.46 |
| 5,509,389 A | * | 4/1996 | Oshima et al. | 123/406.5 |
| 2006/0207554 A1 | * | 9/2006 | Nakamura | 123/406.47 |
| 2006/0231068 A1 | * | 10/2006 | Weiss et al. | 123/325 |
| 2006/0247840 A1 | * | 11/2006 | Matsuda et al. | 701/103 |

FOREIGN PATENT DOCUMENTS

| | | |
|---|---|---|
| DE | 43 34 571 A1 | 4/1995 |
| DE | 101 54 974 A1 | 5/2003 |
| DE | 103 34 401 B3 | 11/2004 |
| EP | 0 241 008 A2 | 10/1987 |
| EP | 1 479 895 A2 | 11/2004 |
| JP | A-7-49073 | 2/1995 |
| JP | A-8-246938 | 9/1996 |
| JP | A-2000-104594 | 4/2000 |
| JP | A-2000-230447 | 8/2000 |
| JP | A-2001-342878 | 12/2001 |
| JP | A-2002-213289 | 7/2002 |
| JP | A-2004-100528 | 4/2004 |
| JP | A-2005-120908 | 5/2005 |
| JP | A-2006-138300 | 6/2006 |
| JP | A-2006-194084 | 7/2006 |

OTHER PUBLICATIONS

Notification of Reasons for Refusal dated Mar. 2, 2009 for corresponding Japanese Patent Application No. 2007-070638 (with translation).

* cited by examiner

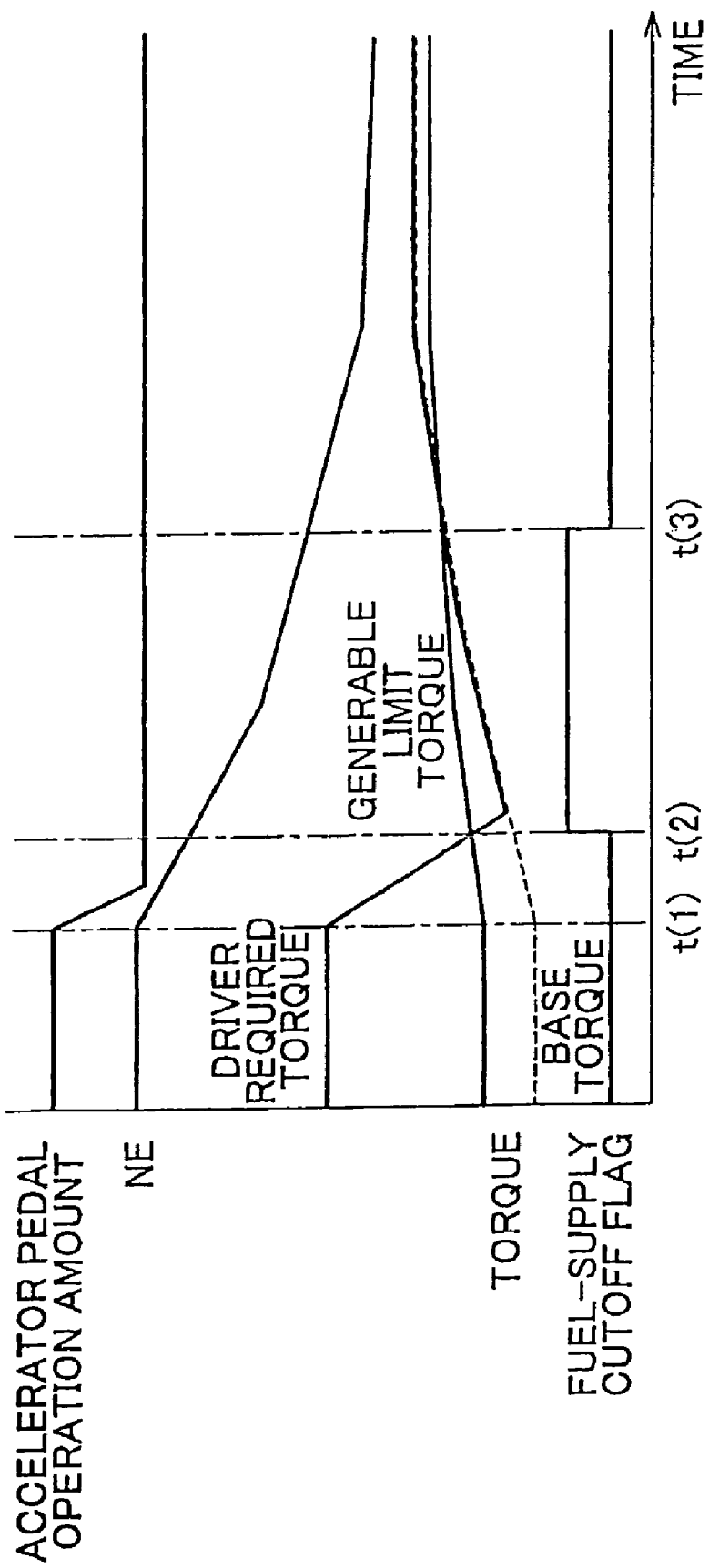

CONTROL UNIT AND CONTROL METHOD FOR TORQUE-DEMAND-TYPE INTERNAL COMBUSTION ENGINE

BACKGROUND OF THE INVENTION

1. Field of the Invention

The invention relates generally to a control unit and control method for an internal combustion engine, which executes a fuel-supply cutoff control, and, more specifically to a fuel-supply cutoff control executed over an internal combustion engine of which the operating state is adjusted to control the output torque (hereinafter, this type of internal combustion engine will be referred to as "torque-demand-type internal combustion engine").

2. Description of the Related Art

In many types of vehicles provided with an internal combustion engine (hereinafter, referred to as "engine" where appropriate), a so-called fuel-supply cutoff control, that is, a control for cutting off the fuel supply, is executed while the vehicle is decelerating in order to enhance the fuel efficiency. The fuel-supply cutoff control is executed in order to enhance the fuel efficiency by minimizing the amount of fuel that is supplied to the engine without impairing the traveling performance of the vehicle and riding comfort. Usually, when the engine speed is within a predetermined engine speed range (when the engine speed is equal to or higher than a fuel-supply cutoff speed) while the vehicle is decelerating with the engine idling, the fuel supply is cut off. More specifically, the fuel supply is cut off when a throttle valve is closed while the vehicle is traveling and the engine speed is equal to or higher than the fuel-supply cutoff speed. Also, when the engine speed decreases to a fuel-supply restart speed that is the lower limit of the engine speed range, the fuel supply is restarted in order to prevent engine stalling.

More specific description will be provided below. When the vehicle is traveling using an inertia force, that is, the vehicle is coasting, for example, when the vehicle is decelerating, the engine is forcibly rotated by an external force and kept rotating. The fuel-supply cutoff control is executed while the engine speed is in an engine speed range in which the engine keeps rotating by itself. In other words, the fuel supply is restarted when it becomes impossible for the engine to rotate by itself. Namely, while the vehicle is decelerating, the fuel supply is cut off until the engine speed decreases to the fuel-supply restart speed.

If a control is executed so that it takes longer for the engine speed to decrease to the fuel-supply restart speed, the time period in which the fuel supply is cut off is prolonged, which further enhances the fuel efficiency. Therefore, in conventional technologies, components that constitute a drive power system (power train system) from an engine to drive wheels are substantially directly connected to mechanically each other in order to minimize a decrease in the engine speed due to, so-called, slippage in the drive power system. In an example of such control, the engine speed during deceleration is made relatively high by engaging a lock-up clutch (direct-connection clutch) of a hydraulic power transmission device, for example, a torque converter.

Because the lock-up clutch connects an input-side member to an output-side member mechanically instead of using fluid, the lock-up clutch also transfers torque fluctuations without moderating them. This may cause a shock and vibration when the fuel-supply cutoff control is started.

Japanese Patent Application Publication No. JP-2001-342878 (JP-A-2001-342878) describes a control unit for an internal combustion engine, which makes it possible to minimize such shock and vibration. The control unit for an internal combustion engine executes a fuel-supply cutoff control for cutting off the fuel supply to the internal combustion engine while the vehicle is traveling. The control unit includes at least one of an immediately-before fuel-supply cutoff torque control unit and an immediately-after fuel-supply cutoff torque control unit. The immediately-before fuel-supply cutoff torque control unit decreases the torque directed from the internal combustion engine toward drive wheels in a drive power system, which is from the internal combustion engine to the drive wheels, immediately before execution of the fuel-supply cutoff control if it is determined that the fuel-supply cutoff control should be executed. The immediately-after fuel-supply cutoff torque control unit increases the torque directed from the internal combustion engine toward the drive wheels in the drive power system immediately after start of the fuel-supply cutoff control.

In the control unit for an internal combustion engine, if it is determined that the fuel-supply cutoff control for cutting off the fuel supply to the internal combustion engine when the vehicle is traveling should be executed, the torque directed from the internal combustion engine toward the drive wheels is decreased immediately before execution of the fuel-supply cutoff control. As a result, when the torque output from the internal combustion engine is decreased due to execution of the fuel-supply cutoff control, the torque directed toward the drive wheels has been decreased to a certain degree. Therefore, the amount of change in the torque received by the drive wheels, which is caused due to execution of the fuel-supply cutoff control, is reduced. When the control unit for an internal combustion engine includes the immediately-after fuel-supply cutoff torque control unit, a control for increasing the torque directed toward the drive wheels in the drive power system is executed immediately after start of the fuel-supply cutoff control. Therefore, a decrease in the torque output from the internal combustion engine and an increase in the torque caused by the immediately-after fuel-supply cutoff torque control unit cancel each other. As a result, even if the torque output from the internal combustion engine decreases due to execution of the fuel-supply cutoff control, the amount of change in the torque received by the drive wheels and the drive power system is reduced.

In a vehicle provided with an engine of which the output torque is controlled independently of an operation of an accelerator pedal performed by a driver, and an automatic transmission, a "drive power control" may be executed. In the drive power control, a target drive torque, which takes a positive value or a negative value and which is calculated based on the amount by which the accelerator pedal is operated by the driver (hereinafter, referred to as "accelerator pedal operation amount" where appropriate), the operating conditions of the vehicle, etc. is achieved by controlling the engine torque and the gear ratio of the automatic transmission. Controls such as a "drive power requiring control", a "drive power demand control", and a "torque-demand control" are similar to the drive power control.

A torque-demand engine control unit calculates a target torque which should be output from an engine based on the accelerator pedal operation amount, the engine speed, and the external load, and controls the fuel injection amount and the air supply amount based on the target torque. This torque-demand engine control unit actually calculates a target generation torque by adding loss load torques, such as a friction torque, that are lost in the engine and a power train system to the required output torque. The engine control unit then controls the fuel injection amount and the air supply amount so that the target generation torque is achieved. The torque-demand engine control unit improves the driving performance, for example, makes it possible to always maintain a constant driving feel, by adjusting the engine torque, which is a physical quantity that directly exerts an influence on the vehicle control, to a reference value. That is, the torque required by the entire vehicle including the engine and the power train system and the target torque are matched with each other by controlling the engine and an automatic transmission (including a lock-up clutch).

In addition, if the torque-demand control method is employed only for the engine (that is, only the engine is a control target and the automatic transmission is not a control target), only the engine is controlled to output a target torque required of the engine.

That is, the throttle valve opening amount, the ignition timing, and the fuel injection amount, at which the target torque is achieved, are calculated based on the relationship among the engine speed NE, the intake efficiency KL (=amount (mass flow) of air taken into cylinder/maximum amount (mass flow) of air that can be taken in cylinder), the ignition timing SA (hereinafter, ignition timing will be referred to as "SA" (Spark Advance) where appropriate), the air-fuel ratio A/F (stoichiometric air-fuel ratio may be used), and the torque. Namely, in the engine torque-demand control described above, an engine ECU (Electronic Control Unit) calculates a target engine torque and controls the throttle valve opening amount, the ignition timing and the fuel injection amount to achieve the target torque.

However, according to JP-A-2001-342878, only a throttle valve and an idle speed control valve are used to decrease the torque immediately before cutting off the fuel supply or increase the torque immediately after the fuel supply is restarted in response to a command to accelerate the vehicle issued by the driver. That is, the torque output from the engine is controlled only by adjusting the intake air amount. As a result, it is sometimes difficult to achieve the required torque.

SUMMARY OF THE INVENTION

The invention provides a control unit and control method for a torque-demand-type internal combustion engine suitable for a fuel-supply cutoff control, which minimizes a shock that is likely to be caused when a fuel-supply cutoff is started and a fuel supply is restarted.

Examples of a control unit for a torque-demand-type internal combustion engine described below include a control unit that is used when a torque required of an engine is achieved by an engine control system in the case where a target torque required by an entire vehicle including the engine and a power train system needs to be achieved.

A first aspect of the invention relates to a control unit for a torque-demand-type internal combustion engine mounted in a vehicle. The control unit includes: a determination unit that determines that a fuel-supply cutoff for cutting off a fuel supply to the internal combustion engine is allowed to start when the state of the vehicle satisfies a predetermined fuel-supply cutoff start condition; and a control unit that executes a torque-demand control using the relationship established among at least an intake efficiency, a torque and an engine speed. The control unit includes an intake efficiency control unit, that decreases the intake efficiency of the internal combustion engine to decrease the torque generated by the internal combustion engine before executing the fuel-supply cutoff, when it is determined that the fuel-supply cutoff is allowed to start, and an ignition timing control unit that retards ignition timing of the internal combustion engine to decrease the torque generated by the internal combustion engine, after the intake efficiency of the internal combustion engine is decreased. The control unit further includes a fuel-supply cutoff control unit that controls the internal combustion engine to execute the fuel-supply cutoff after the ignition timing of the internal combustion engine is retarded.

According to the first aspect of the invention, the fuel-supply cutoff is not started yet when the vehicle state satisfies the predetermined fuel-supply cutoff start condition. Before execution of the fuel-supply cutoff, the intake efficiency of the internal combustion engine is decreased to decrease the torque, and then, the ignition timing is retarded to decrease the torque. In this way, the fuel-supply cutoff is actually executed after the intake efficiency is decreased and the ignition timing is retarded. The torque-demand control is employed in the control for decreasing the intake efficiency and the control for retarding the ignition timing. Thus, the fuel-supply cutoff is executed after the torque output from the internal combustion engine is smoothly decreased by a sufficient amount. Therefore, it is possible to reduce a stepwise change in the torque. Accordingly, it is possible to reduce a shock that is caused when the fuel-supply cutoff is started. As a result, it is possible to provide the control unit for a torque-demand-type internal combustion engine suitable for the fuel-supply cutoff control, which minimizes a shock that is likely to be caused when the fuel-supply cutoff is started.

A second aspect of the invention relates to the control unit according to the first aspect of the invention, in which the intake efficiency control unit decreases the intake efficiency to a predetermined lower limit value.

According to the second aspect of the invention, the ignition timing is retarded after the intake efficiency is decreased to the lower limit value that is the lower limit of the range in which the fuel injected from an injector is ignited. Therefore, it is possible to execute the fuel-supply cutoff after the torque output from the internal combustion engine is decreased by a sufficient amount.

A third aspect of the invention relates to the control unit according to the first aspect of the invention, in which the ignition timing control unit retards the ignition timing to predetermined retardation limit timing.

According to the third aspect of the invention, it is possible to reduce a stepwise change in the torque, which is likely to be caused when the fuel-supply cutoff is executed, because the fuel-supply cutoff is executed after the ignition timing is retarded to the retardation limit timing.

A fourth aspect of the invention relates to the control unit according to the third aspect of the invention, in which the ignition timing control unit calculates the ignition timing using the actual intake efficiency.

According to the fourth aspect of the invention, when the torque-demand control is executed using the relationship established among the intake efficiency, the torque and the engine speed to retard the ignition timing, the ignition timing is calculated using the actual intake efficiency. Therefore, it is possible to accurately retard the ignition timing to the retardation limit timing.

A fifth aspect of the invention relates to the control unit according to the third or fourth aspect of the invention, in which the fuel-supply cutoff control unit controls the internal combustion engine so that the fuel-supply cutoff is executed when the ignition timing of the internal combustion engine is retarded to the retardation limit timing.

According to the fifth aspect of the invention, when the ignition timing of the internal combustion engine is retarded to the retardation limit timing (when the torque required by the driver falls below the generable limit torque), the torque generated by the internal combustion engine is decreased to the fullest extent. Therefore, it is possible to minimize a stepwise change in the torque caused when the fuel-supply cutoff is executed.

A sixth aspect of the invention relates to a control unit for a torque-demand-type internal combustion engine which is mounted in a vehicle and which is suitable for a fuel-supply cutoff control, as the first aspect of the invention. The control unit includes: a fuel supply restart control unit that controls the internal combustion engine so that a fuel supply is restarted when a predetermined condition is satisfied while a fuel-supply cutoff for cutting off a fuel supply to the internal combustion engine is executed; and a control unit that executes a torque-demand control using the relationship established among at least an intake efficiency, a torque and an engine speed. The control unit includes an ignition timing control unit that advances ignition timing of the internal combustion engine to increase the torque generated by the internal combustion engine when the fuel supply is restarted, and an intake efficiency control unit that increases the intake efficiency of the internal combustion engine to increase the torque generated by the internal combustion engine after the ignition timing of the internal combustion engine is advanced.

According to the sixth aspect of the invention, when the vehicle state satisfies the predetermined fuel supply restart condition while the fuel-supply cutoff is executed, the fuel supply is restarted (fuel injection control and ignition control are restarted).

When the fuel supply is restarted, the ignition timing is advanced to increase the torque, and then the intake efficiency is increased to increase the torque. The torque-demand control is employed in the control for advancing the ignition timing and the control for increasing the intake efficiency. Thus, it is possible to smoothly increase the torque output from the internal combustion engine by a sufficient amount after the fuel supply is restarted. Therefore, a difference between the output torque and the torque required by the driver is reduced. Therefore, it is possible to reduce a shock caused when the fuel supply is restarted. As a result, it is possible to provide the control unit for a torque-demand-type internal combustion engine suitable for the fuel-supply cutoff control, which minimizes a shock caused when the fuel supply is restarted.

A seventh aspect of the invention relates to the control unit according to the sixth aspect of the invention, in which the ignition timing control unit advances the ignition timing to predetermined reference ignition timing.

According to the seventh aspect of the invention, after the fuel supply is restarted, the ignition timing is advanced to the reference ignition timing (e.g. base ignition timing or ignition timing corresponding to MBT (Minimum spark advance for Best Torque)). Therefore, it is possible to promptly increase the torque when the fuel supply is restarted.

An eighth aspect of the invention relates to the control unit according to the sixth aspect of the invention, in which the ignition timing control unit calculates the ignition timing using the actual intake efficiency, and advances the ignition timing to predetermined reference ignition timing.

According to the eighth aspect of the invention, when the torque-demand control is executed using the relationship established among the intake efficiency, the torque and the engine speed to advance the ignition timing, the ignition timing is calculated using the actual intake efficiency. Therefore, it is possible to accurately advance the ignition timing to the reference ignition timing.

A ninth aspect of the invention relates to a method for controlling a torque-demand-type internal combustion engine mounted in a vehicle. According to the method, when the state of the vehicle satisfies a predetermined fuel-supply cutoff start condition, it is determined that a fuel-supply cutoff for cutting off a fuel supply to the internal combustion engine is allowed to start. A torque-demand control is executed using the relationship established among at least an intake efficiency, a torque and an engine speed. In the torque-demand control, when it is determined that the fuel-supply cutoff is allowed to start, before executing the fuel-supply cutoff, the intake efficiency of the internal combustion engine is decreased to decrease the torque generated by the internal combustion engine, and ignition timing of the internal combustion engine is retarded to decrease the torque generated by the internal combustion engine after the intake efficiency of the internal combustion engine is decreased. After the ignition timing of the internal combustion engine is retarded, the internal combustion engine is controlled to execute the fuel-supply cutoff.

A tenth aspect of the invention relates to a method for controlling a torque-demand-type internal combustion engine which is mounted in a vehicle and which is suitable for a fuel-supply cutoff control. According to the method, when a predetermined condition is satisfied while a fuel-supply cutoff for cutting off a fuel supply to the internal combustion engine is executed, the internal combustion engine is controlled so that a fuel supply is restarted. A torque-demand control is executed using the relationship established among at least an intake efficiency, a torque and an engine speed. In the torque-demand control, when the fuel supply is restarted, ignition timing of the internal combustion engine is advanced to increase the torque generated by the internal combustion engine. After the ignition timing of the internal combustion engine is advanced, the intake efficiency of the internal combustion engine is increased to increase the torque generated by the internal combustion engine.

BRIEF DESCRIPTION OF THE DRAWINGS

The foregoing and further features and advantages of the invention will become apparent from the following description of an example embodiment with reference to the accompanying drawings, wherein the same or corresponding portions will be denoted by the same reference numerals and wherein:

FIG. 5 is a timing chart that includes the time at which the fuel-supply cutoff is started and the time at which the fuel supply is restarted;

DETAILED DESCRIPTION OF THE EMBODIMENT

Figure 1:
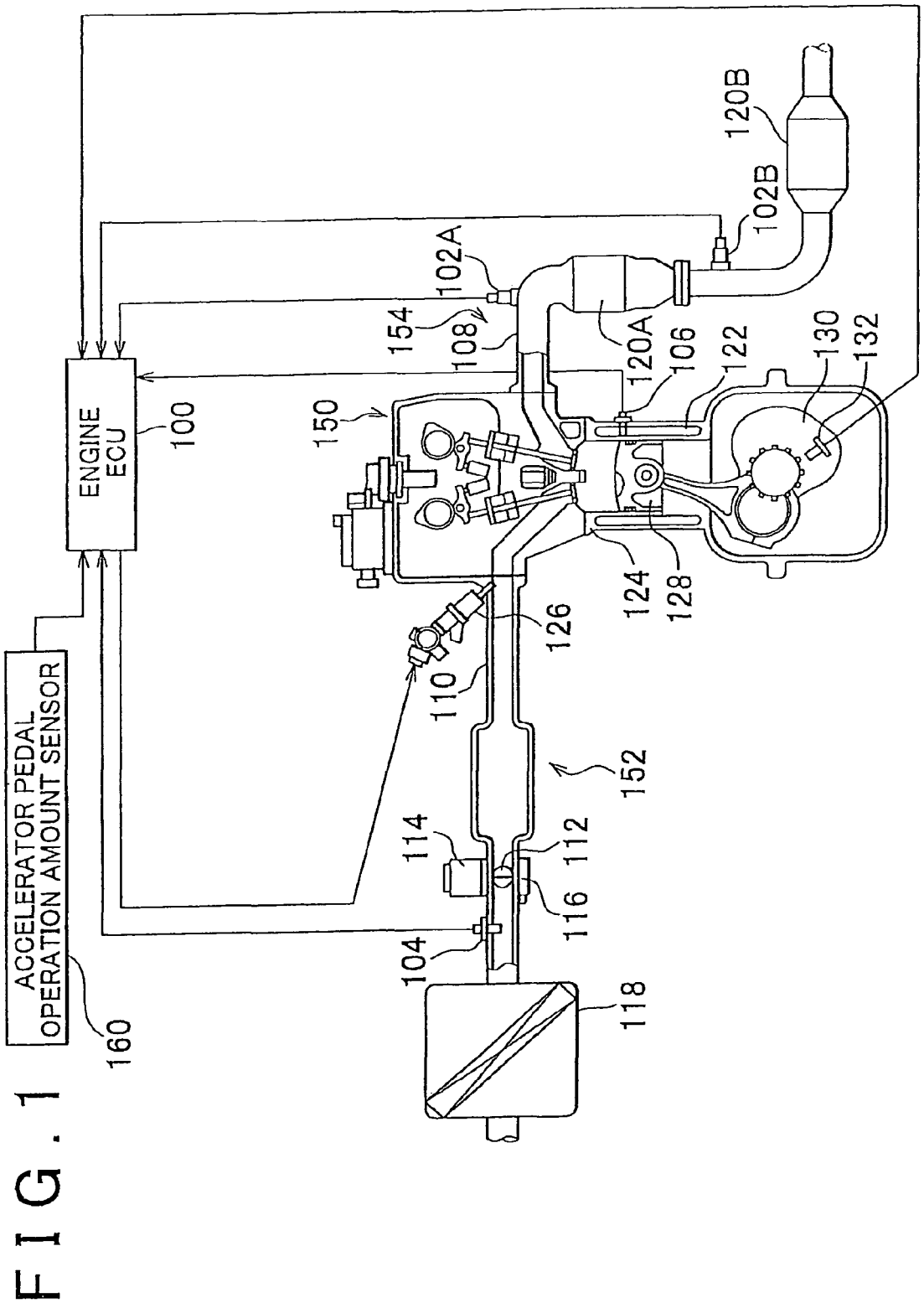
FIG. 1 is a control block diagram for a vehicle provided with a control unit according to an embodiment of the invention.

Hereafter, an embodiment of the invention will be described with reference to the accompanying drawings. In the description below, the same components will be denoted by the same reference numerals. Because the names and the functions of the components having the same reference numerals are also the same, the detailed description thereof will be provided only once below. The following description will be provided on the assumption that a torque-demand control is executed over an engine.

As shown in FIG. 1, a vehicle provided with a control unit according to the embodiment of the invention includes an engine 150, an intake system 152, an exhaust system 154, and an engine ECU 100. Although the engine 150 is a port-injection gasoline engine, the engine 150 may be provided with a direct-injection fuel injector that directly injects fuel into a cylinder instead of or in addition to a port injector.

The intake system 152 includes an intake passage 110, an air cleaner 118, an airflow meter 104, a throttle motor 114, a throttle valve 112, and a throttle position sensor 116.

The air taken in from the air cleaner 118 flows into the engine 150 through the intake passage 110. The throttle valve 112 is provided in a middle portion of the intake passage 110. The throttle valve 112 is opened and closed in accordance with the operation of the throttle motor 114. The opening amount of the throttle valve 112 is detected by the throttle position sensor 116. The airflow meter 104, which detects the intake air amount, is provided in the intake passage at a position between the air cleaner 118 and the throttle valve 112. The airflow meter 104 transmits an intake-air amount signal that indicates the intake air amount Q to the engine ECU 100.

The engine 150 includes a coolant passage 122, a cylinder block 124, an injector 126, pistons 128, a crankshaft 130, a coolant temperature sensor 106, and a crank position sensor 132.

A predetermined number of cylinders are formed within the cylinder block 124, and the pistons 128 are provided in the respective cylinders. The mixture of the fuel injected from the injector 126 and the intake air is introduced into a combustion chamber formed above the piston 128 through the intake passage 110, and ignited by a spark plug (not shown). When combustion takes place, the piston 128 is pushed down. The reciprocation of the piston 128 is converted into the rotation of the crankshaft 130 via a crank mechanism. The engine ECU 100 detects the rotational speed NE of the engine 150 based on a signal from the crank position sensor 132.

A coolant is circulated through the coolant passage 122 formed within the cylinder block 124 in accordance with the operation of a water pump (not shown). The coolant in the coolant passage 122 flows to a radiator (not shown) connected to the coolant passage 122 and cooled by a cooling fan (not shown). The coolant temperature sensor 106, which detects the temperature THW of the coolant in the coolant passage 122 (engine coolant temperature THW), is provided on the coolant passage 122. The coolant temperature sensor 106 transmits a signal that indicates the detected engine coolant temperature THW to the engine ECU 100.

The exhaust system 154 includes an exhaust passage 108, a first air-fuel ratio sensor 102A, a second air-fuel ratio sensor 102B, a first three-way catalytic converter 120A, and a second three-way catalytic converter 120B. The first air-fuel ratio sensor 102A is provided at a position upstream of the first three-way catalytic converter 120A, and the second air-fuel ratio sensor 102B is provided at a position downstream of the first three-way catalytic converter 120A (upstream of the second three-way catalytic converter 120B). Instead of providing two three-way catalytic converters, only one three-way catalytic converter may be provided.

The exhaust passage 108 that is connected to an exhaust port of the engine 150 is connected to the first three-way catalytic converter 120A and the second three-way catalytic converter 120B. That is, the exhaust gas generated due to the combustion of the air-fuel mixture, which takes place in the combustion chamber of the engine 150, first flows into the first three-way catalytic converter 120A. HC and CO contained in the exhaust gas introduced into the first three-way catalytic converter 120A are oxidized in the first three-way catalytic converter 120A. NOx contained in the exhaust gas introduced into the first three-way catalytic converter 120A is reduced in the first three-way catalytic converter 120A. The first three-way catalytic converter 120A is provided near the engine 150. Even when the engine 150 is started while it is cold, the temperature of the first three-way catalytic converter 120A is promptly increased and therefore the three-way catalytic converter 120A exhibits its catalytic function promptly.

Then, the exhaust gas is delivered from the first three-way catalytic converter 120A to the second three-way catalytic converter 120B in order to remove the NOx. The first three-way catalytic converter 120A and the second three-way catalytic converter 120B basically have the same structure and function.

The first air-fuel ratio sensor 102A, which is provided at a position upstream of the first three-way catalytic converter 120A, and the second air-fuel ratio sensor 102B, which is provided at a position downstream of the first three-way catalytic converter 120A and upstream of the second three-way catalytic converter 120B, detect the oxygen concentration in the exhaust gas that will pass through the first three-way catalytic converter 120A and the exhaust gas that will pas through the second three-way catalytic converter 120B, respectively. It is possible to detect the ratio between the fuel and the air that are contained in the exhaust gas, that is, the air-fuel ratio, by detecting the oxygen concentration in the exhaust gas.

Each of the first air-fuel ratio sensor 102A and the second air-fuel ratio sensor 102B generates an electric current having a magnitude that corresponds to the oxygen concentration in the exhaust gas. The current value is converted into, for example, the pressure value, and a signal that indicates the pressure value is transmitted to the engine ECU 100. Therefore, it is possible to detect the air-fuel ratio of the exhaust gas upstream of the first three-way catalytic converter 120A based on the signal output from the first air-fuel ratio sensor 102A. Also, it is possible to detect the air-fuel ratio of the exhaust gas upstream of the second three-way catalytic converter 120B based on the signal output from the second air-fuel ratio sensor 102B. Each of the first air-fuel ratio sensor 102A and the second air-fuel ratio sensor 102B generates a voltage of, for example, approximately 0.1 V when the air-fuel ratio is higher than the stoichiometric air-fuel ratio, and generates a voltage of, for example, approximately 0.9 V when the air-fuel ratio is lower than the stoichiometric air-fuel ratio. The values obtained by converting these voltage values into the air-fuel ratios and the threshold value of the air-fuel ratio are compared with each other, and the engine ECU 100 controls the air-fuel ratio based on the result of comparison.

The first three-way catalytic converter 120A and the second three-way catalytic converter 120B each have a function of reducing NOx while oxidizing HC and CO when the air-fuel ratio is substantially equal to the stoichiometric air-fuel ratio, that is, a function of removing HC, CO and NOx at the same time. In the first three-way, catalytic converter 120A and the second catalytic converter 120B, the oxidizing action becomes active but the reducing action becomes inactive when the air-fuel ratio is higher than the stoichiometric air-fuel ratio and the exhaust gas contains a large amount of oxygen, whereas the reducing action becomes active but the oxidizing action becomes inactive when the air-fuel ratio is lower than the stoichiometric air-fuel ratio and the exhaust gas contains a small amount of oxygen. Therefore, it is not possible to appropriately remove HC, CO and NOx at the same time.

An accelerator pedal operation amount sensor is connected to the engine ECU 100, and detects the operation amount of an accelerator pedal, which is operated by a driver.

The engine ECU 100 executes a torque-demand control over the engine 150. The engine ECU 100 calculates the throttle valve opening amount, the ignition timing and the fuel injection amount, at which the target torque is achieved, based on the relationship among the engine speed NE, the intake efficiency KL, the ignition timing SA, the air-fuel ratio A/F (stoichiometric air-fuel ratio is used in this case), and the torque. Then, the engine ECU 100 controls the opening amount of the throttle valve 112, the ignition timing, and the amount of fuel injected from the injector 126 (more specifically, the engine ECU 100 controls the fuel injection duration to control the fuel injection amount in a region (fuel injection amount limit region) in which a linear relationship is established between the fuel injection duration and the fuel injection amount).

In the engine torque demand control, the engine ECU 100 calculates the target torque that should be generated by the engine, and controls the throttle valve opening amount, the ignition timing and the fuel injection amount to achieve the target torque. In addition, the engine ECU 100 calculates the throttle valve opening amount based on the target intake efficiency KL, which is calculated based on the target torque, and controls the throttle valve 112 to achieve the calculated throttle valve opening amount. Under this control, the opening amount of the throttle valve 112 is adjusted and the intake efficiency KL changes. The current intake efficiency KL is detected, and the ignition timing is controlled based on the current intake efficiency KL.

Figure 2:
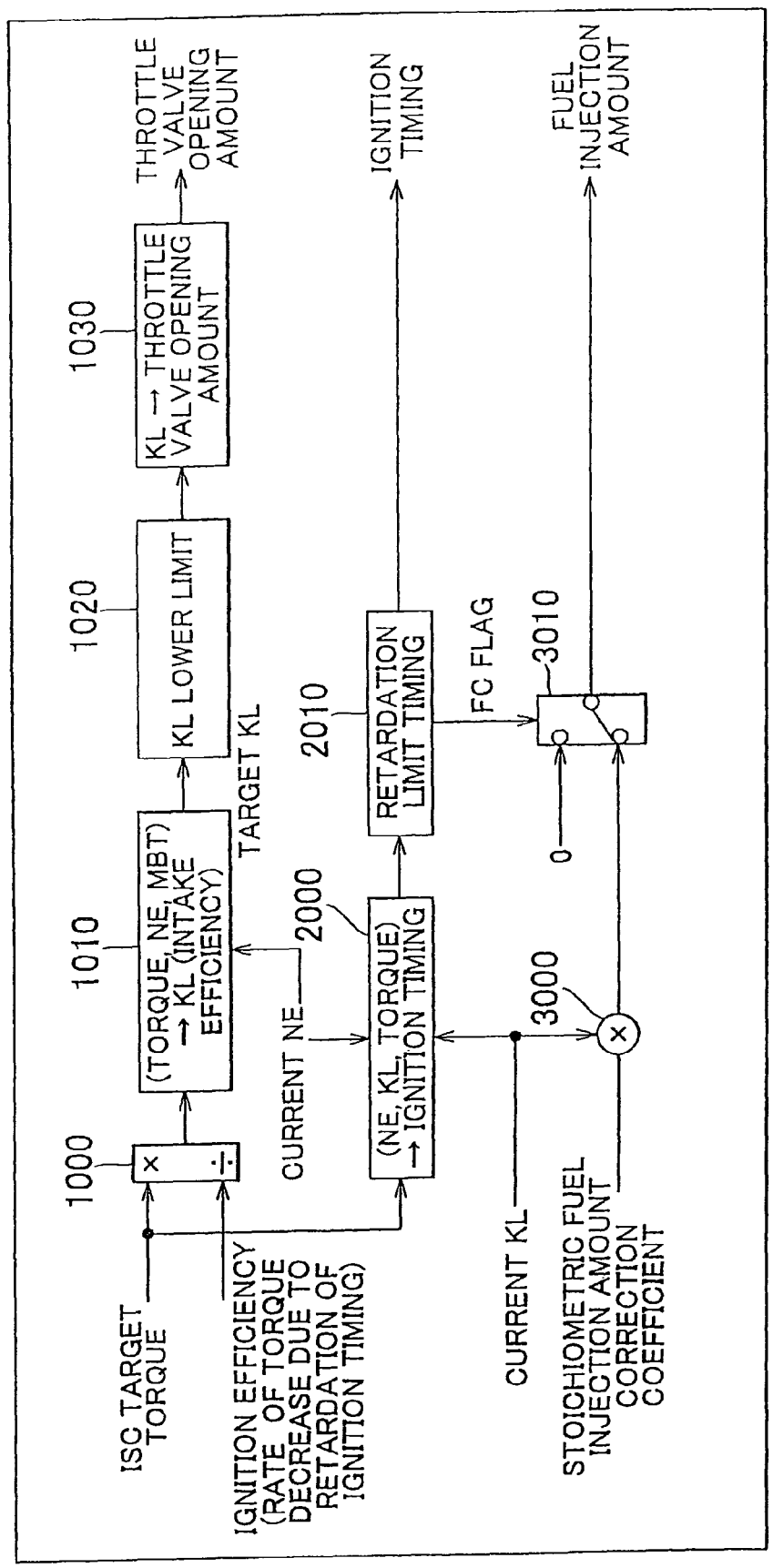
FIG. 2 is a control block diagram for the control unit according to the embodiment of the invention.

FIG. 2 is a functional block diagram of the control unit according to the embodiment of the invention. As shown in FIG. 2, the control unit (implemented by the engine ECU 100) smoothly decreases the torque output from the engine 150 when cutting off the fuel supply, and promptly increases the torque output from the engine 150 immediately after restarting the fuel supply in response to an operation of the accelerator pedal (acceleration command) performed by the driver. At this time, the torque-demand control is executed. The case in which the torque output from the engine 150 is smoothly decreased immediately before the fuel supply is cut off will be described below.

The following process is executed to decrease the torque output from the engine 150. A computing unit 1000 calculates a torque (target torque) by Multiplying the target torque used in the ISC (Idle Speed Control) (hereinafter, referred to as "ISC target torque" where appropriate) by the ignition efficiency, which is a rate of torque decrease caused by retarding the ignition timing. A KL computation unit 1010 calculates a target intake efficiency (hereinafter, referred to as "target KL" where appropriate) based on the calculated target torque, the engine speed NE (current engine speed), and MBT (Minimum spark advance for Best Torque). The target KL is decreased (namely, the target torque that should be output from the engine 150 is decreased) until the target KL reaches the KL lower limit value of the target KL range (stored in a lower limit value storage unit 1020). When the target KL reaches the KL lower limit value, retardation of the ignition timing is started to decrease the torque. A throttle valve opening amount calculation unit 1030 calculates the opening amount of the throttle valve 112 (hereinafter, referred to as "throttle valve opening amount" where appropriate) based on the target KL.

When the target KL reaches the KL lower limit value, the current intake efficiency KL (hereinafter, referred to as "current KL" where appropriate) is detected, and an ignition timing calculation unit 2000 calculates the ignition timing based on the engine speed NE (current engine speed), the current KL and the above-described target torque. The ignition timing is retarded (namely, the target torque that should be output from the engine 150 is decreased) until the ignition timing reaches the retardation limit timing of the ignition timing range (stored in a retardation limit timing storage unit 2010). When the ignition timing reaches the retardation limit timing, a fuel-supply cutoff flag is set to decrease the fuel injection amount to zero.

In each of the case in which the target KL is decreased to the KL lower limit value and the case in which the ignition timing is retarded to the retardation limit timing, a fuel injection amount calculation unit (multiplier) 3000 calculates the amount of fuel injected from the injector 126 by multiplying the current KL by the stoichiometric fuel injection amount correction coefficient.

A selector 3010 selects the fuel injection amount calculated by the multiplier 3000 if the fuel-supply cutoff flag is not set, whereas it selects zero as the fuel injection amount (fuel injection cutoff) if the fuel-supply cutoff flag is set.

The control unit according to the embodiment of the invention may be implemented by hardware formed mainly of a structure including a digital circuit or an analog circuit, or software formed mainly of a CPU (Central Processing Unit) and a memory included in the engine ECU 100 and a program that is read from the memory and executed by the CPU. In general, implementing the control unit using hardware offers advantages in the operation speed, and implementing the control unit using software offers advantages in design change. The description below will be provided on the assumption that the control unit is implemented by software.

Figure 3A:
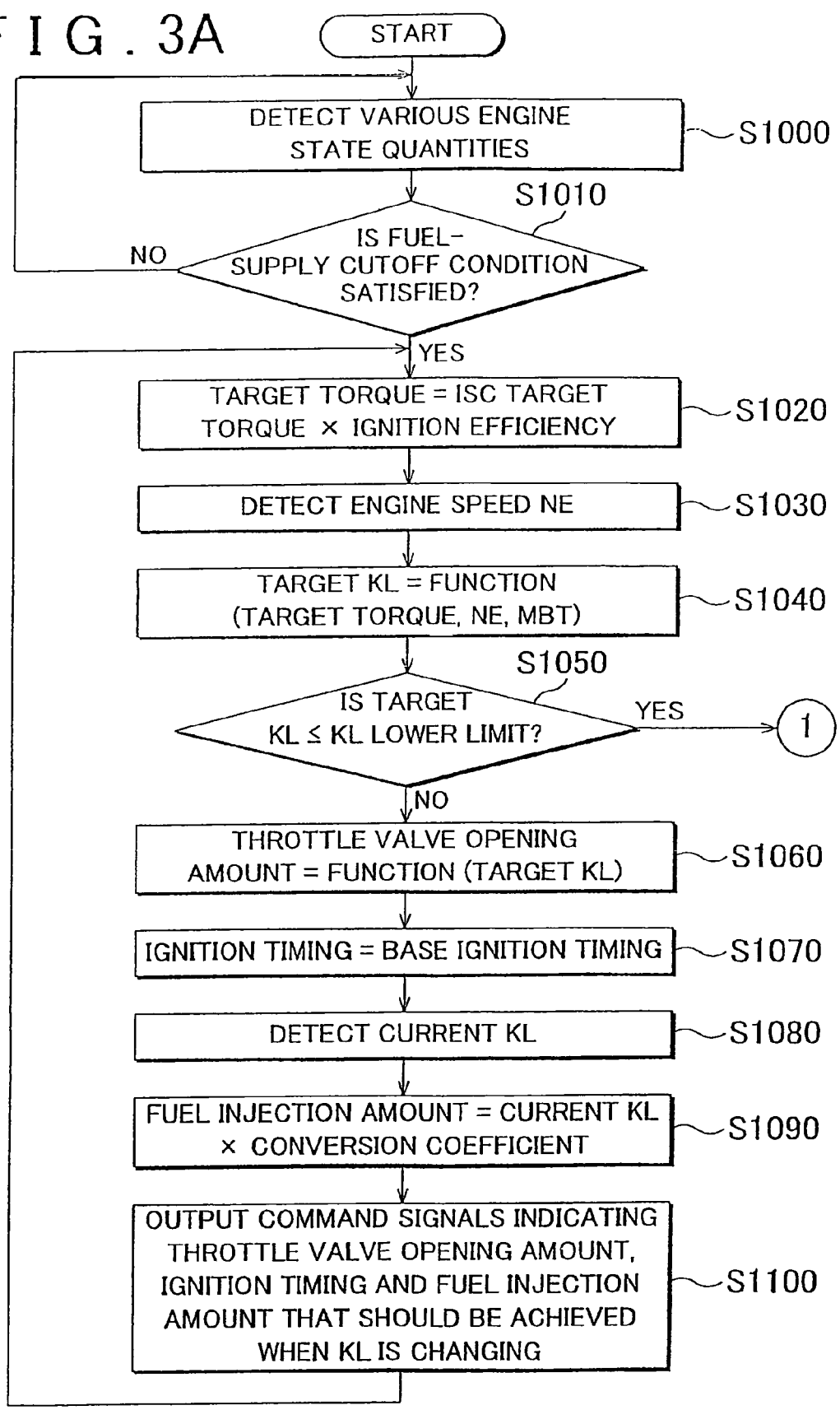
FIG. 3A and FIG. 3B are flowcharts showing a control routine executed by an engine ECU in FIG. 1 when the fuel-supply cutoff is started.
Figure 3B:
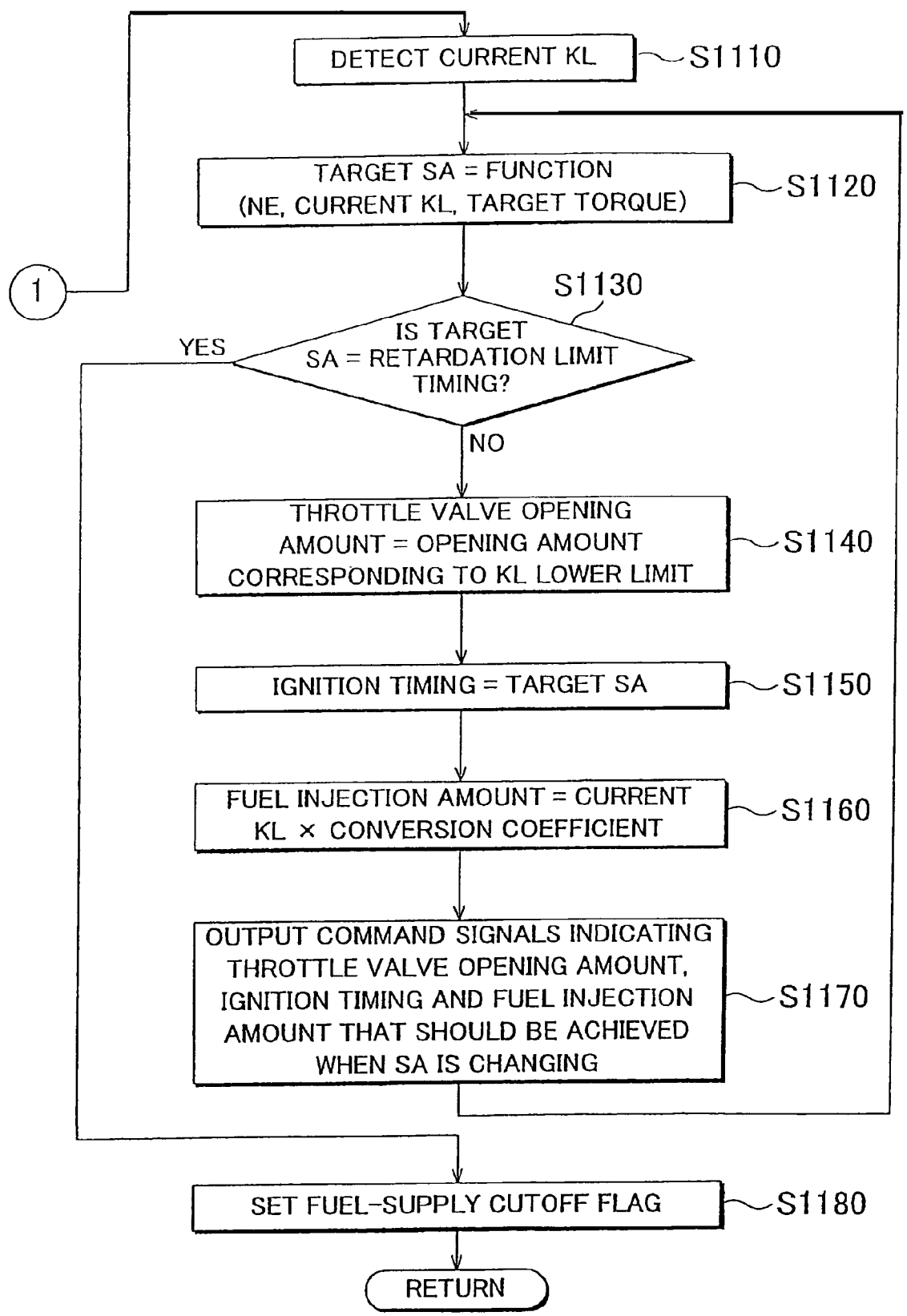

With reference to FIG. 3A and FIG. 3B, a description will be provided on the control routine executed by the engine ECU 100, which is the control unit according to the embodiment of the invention, when the fuel-supply cutoff is started. The control routine is a subroutine program that is periodically executed at predetermined time intervals.

In step (hereinafter, referred to as "S") 1000, the engine ECU 100 detects various state quantities of the engine 150. The engine ECU 100 detects, for example, the engine speed, the accelerator pedal operation amount, and the engine coolant temperature.

In S1010, the engine ECU 100 determines whether the fuel-supply cutoff condition has been satisfied. At this time, the engine ECU 100 makes the above-mentioned determination based on the engine speed, the accelerator pedal operation amount, the engine coolant temperature, etc. detected in S1000. If it is determined that the fuel-supply cutoff condition has been satisfied ("YES" in S1010), S1020 is executed. On the other hand, if it is determined that the fuel-supply cutoff condition has not been satisfied ("NO" in S1010), S1000 is executed again. Because this routine is the subroutine program, if a negative determination is made in S1010, the process may return to the main routine.

In S1020, the engine ECU 100 calculates the target torque by multiplying the ISC target torque by the ignition efficiency. In S1030, the engine ECU 100 detects the engine speed NE. In S1040, the engine ECU 100 calculates the target KL using the function of which the variables are the target torque, the engine speed NE and the MBT.

In S1050, the engine ECU 100 determines whether the target KL has decreased to the KL lower limit value. If it is determined that the target KL is equal to or lower than the KL lower limit value ("YES" in S1050), S1110 is executed. On the other hand, if it is determined that the target KL is higher than the KL lower limit value ("NO" in S1050), S1060 is executed.

In S1060, the engine ECU 100 calculates the opening amount of the throttle valve 112 using the function of which the variable is the target KL. In S1070, the engine ECU 100 sets the ignition timing to the base ignition timing.

In S1080, the engine ECU 100 detects the current intake efficiency (current KL). In S1090, the engine ECU 100 calculates the amount of fuel injected from the injector 126 (fuel injection amount) by multiplying the target KL by the conversion coefficient.

In S1100, the engine ECU 100 transmits command signals that indicate the throttle valve opening amount, the ignition timing and the fuel injection amount which should be achieved when the intake efficiency KL is changing to a controller for controlling the opening amount of the throttle valve 112, an ignition timing controller, and a fuel injection amount controller, respectively. As a result, the target KL is decreased, and the torque output from the engine 150 is decreased. Then, S1020 is executed again.

In S1110, the engine ECU 100 detects the current intake efficiency (current KL). In S1120, the engine ECU 100 calculates the target ignition timing (hereinafter, referred to as "target SA" where appropriate) using the function of which the variables are the engine speed NE, the current KL and the target torque.

In S1130, the engine ECU 100 determines whether the target SA has reached the retardation limit timing. If it is determined that the target SA has reached the retardation limit timing ("YES" in S1130), S1180 is executed. On the other hand, if it is determined that the target SA has not reached the retardation limit ("NO" in S1130), S1140 is executed.

In S1140, the engine ECU 100 sets the opening amount of the throttle valve 112 to the opening amount that corresponds to the KL lower limit. In S1150, the engine ECU 100 sets the ignition timing to the target SA. In S1160, the engine ECU 100 calculates the amount of fuel injected from the injector 126 (fuel injection amount) by multiplying the target KL by the conversion coefficient.

In S1170, the engine ECU 100 transmits command signals, which indicate the throttle valve opening amount, the ignition timing and the fuel injection amount that should be achieved when the ignition timing SA is changing; to the controller for controlling the opening amount of the throttle valve 112, the ignition timing controller, and the fuel injection amount controller, respectively. As a result, the ignition timing is retarded, and the torque output from the engine 150 is decreased. Then, S1120 is executed again.

In S1180, the engine ECU 100 sets the fuel-supply cutoff flag. Thus, the fuel supply to the engine 150 is actually cut off.

Figure 4A:
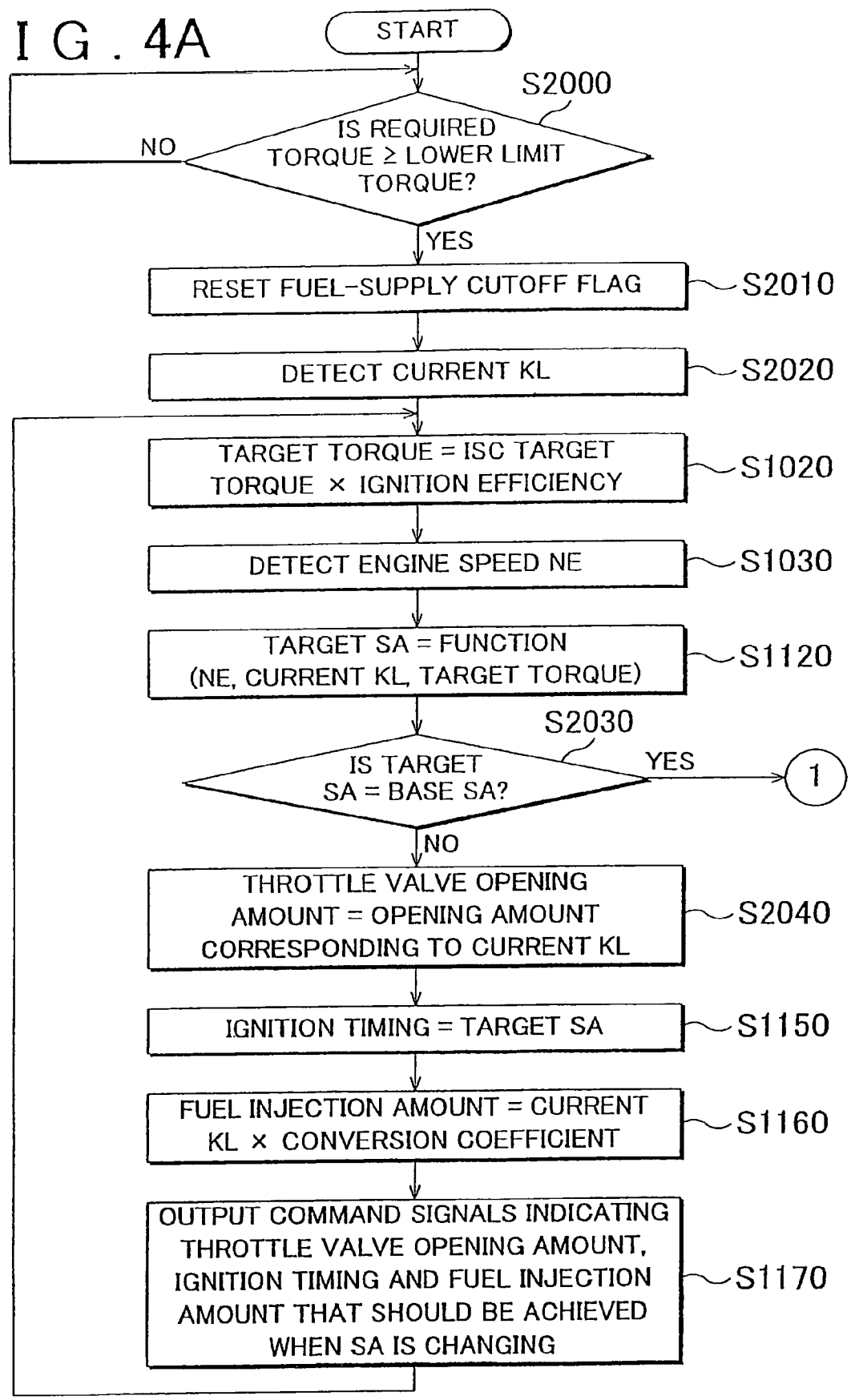
FIG. 4A and FIG. 4B is a flowchart showing a control routine executed by the engine ECU in FIG. 1 when the fuel supply is restarted.
Figure 4B:
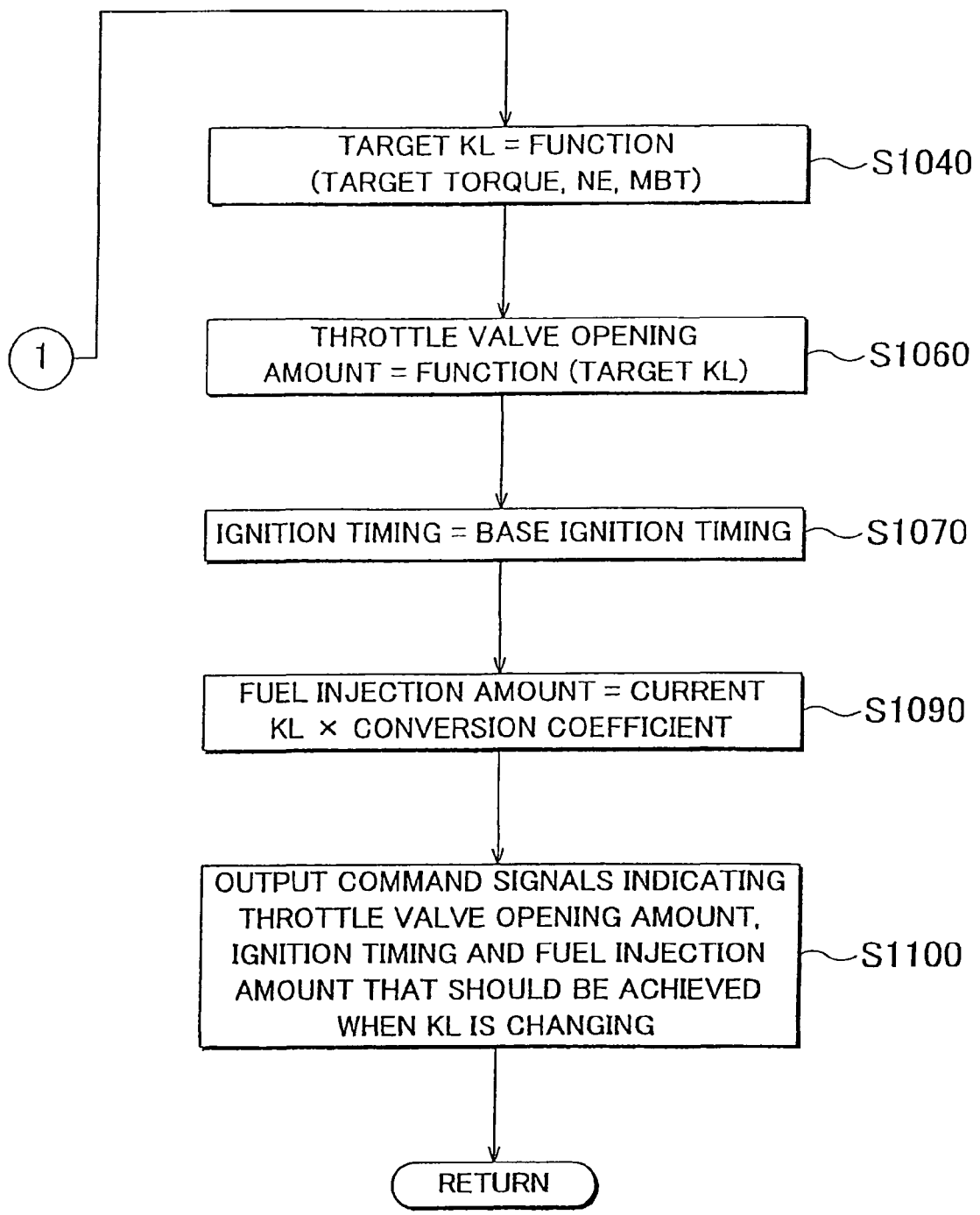

With reference to FIG. 4A and FIG. 4B, a description will be provided on the control routine executed by the engine ECU 100, which is the control unit according to the embodiment of the invention, when the fuel supply is restarted. The control routine is a subroutine program that is periodically executed at predetermined time intervals. In FIG. 4A and FIG. 4B, the steps that are the same as those in the flowchart in FIG. 3A and FIG. 3B will be denoted by the same step numbers. Because the processes in the steps having the same step numbers are also the same, the detailed description thereof will not be provided below.

In S2000, the engine ECU 100 determines whether the torque required by the driver has increased to a value equal to or higher than the lower limit torque (generable limit torque). If it is determined that the torque required by the driver is equal to or higher than the lower limit torque ("YES" in S2000), S2010 is executed. On the other hand, if it is determined that the torque required by the driver is lower than the lower limit torque ("NO" in S2000), S2000 is executed again.

In S2010, the engine ECU 100 resets the fuel-supply cutoff flag. Thus, the fuel-supply cutoff is cancelled, and the fuel supply to the engine 150 is actually restarted.

In S2020, the engine 100 detects the current intake efficiency (current KL). Then, S1020, S1030 and S1120 are executed. In this process, the ignition timing that has been retarded to the retardation limit timing is gradually advanced.

In S2030, the engine ECU 100 determines whether the target SA has reached the base SA (base ignition timing). If it is determined that the target SA has reached the base SA ("YES" in S2030), S1040 is executed. On the other hand, if it is determined that the target SA has not reached the base SA ("NO" in S2030), S2040 is executed.

In S2040, the engine ECU 100 sets the opening amount of the throttle valve 112 to the opening amount that corresponds to the current KL. Then, S1150, S1160 and S1170 are executed. In this process, the ignition timing is advanced and the torque output from the engine 150 is increased. Then, S1020 is executed again.

When an affirmative determination is made in S2030, S1040, S1060, S1070, S1090 and S1100 are executed. In this process, the target KL is increased and the torque output from the engine 150 is increased.

The fuel-supply cutoff operation of the engine 150 that is controlled by the control unit (ECU) according to the embodiment of the invention, which has the above-described configuration and which executes the above-described flowcharts, will be described with reference to FIG. 5 (entire timing chart), FIG. 6 (detailed timing chart showing the state when the fuel-supply cutoff is started) and FIG. 7 (detailed timing chart showing the state when the fuel supply is restarted).

When Fuel-Supply Cutoff is Started

When the vehicle is traveling, if the driver does not depress the accelerator pedal, for example, on a downhill slope, the fuel-supply cutoff condition is satisfied ("YES" in S1010). The fuel-supply cutoff condition is satisfied at time t1 in FIG. 5.

The control unit according to the embodiment of the invention does not cut off the fuel supply at time t1. Instead, the control unit 1) decreases the KL to the KL lower limit to decrease the torque, 2) retards the ignition timing to the retardation limit timing to decrease the torque when the KL reaches the KL lower limit, and 3) actually cuts off the fuel supply when the ignition timing reaches the retardation limit timing. The control unit actually cuts off the fuel supply at time t2.

More detailed description will be provided below with reference to FIG. 6 (and FIG. 3A and FIG. 3B). FIG. 6 is a detailed timing chart that corresponds to the period from time t1 to time t2 in FIG. 5.

Figure 6:
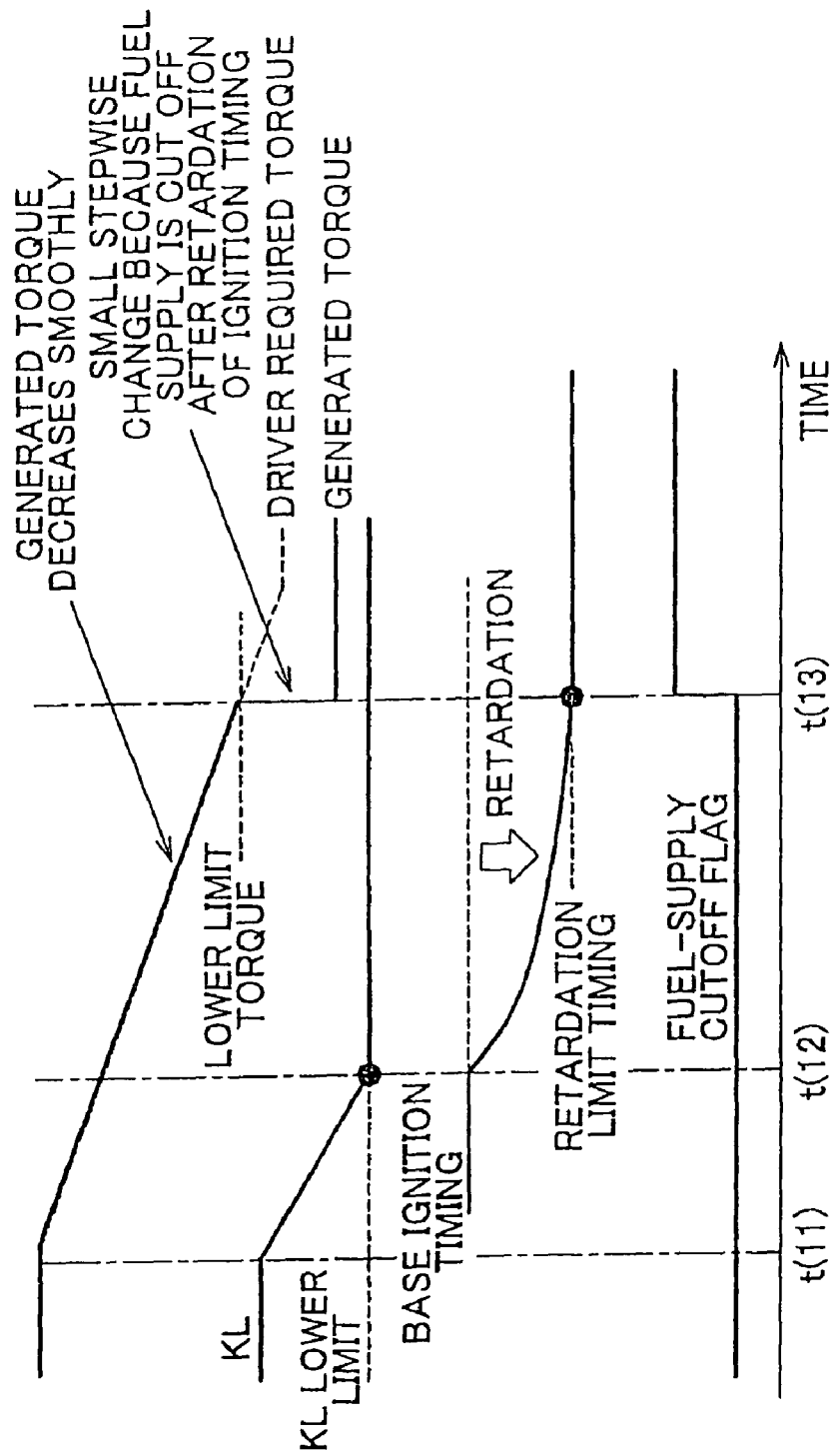
FIG. 6 is a detailed timing chart showing the state, shown in FIG. 5, when the fuel-supply cutoff is started.

When the fuel-supply cutoff condition is satisfied at time t11 in FIG. 6 ("YES" in S1010), the target torque is calculated by multiplying the ISC target torque by the ignition efficiency (S1020), the engine speed NE is detected (S1030), and the target KL is calculated based on the target torque, the engine speed NE and the MBT (S1040).

When the target KL has not reached the KL lower limit ("NO" in S1050), the opening amount of the throttle valve 112 is calculated based on the target KL (S1060), and the ignition timing is set to the base ignition timing (S1070). More specifically, first, the target KL is decreased to decrease the torque output from the engine 150 with the ignition timing kept unchanged. The fuel injection amount is calculated by multiplying the current KL by the conversion coefficient (S1090).

Command signals that indicate the calculated throttle valve opening amount, ignition timing and fuel injection amount are transmitted to the controller for controlling the opening amount of the throttle valve 112, the ignition timing controller and the fuel injection amount controller, respectively. This process is periodically executed until the target KL reaches the KL lower limit. As a result, the target KL is decreased and the torque output from the engine 150 is decreased.

The duration of time until the target KL reaches the KL lower limit corresponds to the period from time t11 to time t12 in FIG. 6. In this period, the KL is decreased to the KL lower limit, and the torque generated by the engine 150 is smoothly decreased.

Next, when the target KL reaches the KL lower limit ("YES" in S1050), the current KL is detected (S1110), and the target SA is calculated based on the engine speed, the current KL and the target torque (S1120). When the target SA has not reached the retardation limit timing ("NO" in S1130), the opening amount of the throttle valve 112 is set to the opening amount that corresponds to the KL lower limit (S1140), and the ignition timing is set to the target SA (S1150). More specifically, after the torque generated by the engine 150 is smoothly decreased by decreasing the target KL (after the target KL reaches the KL lower limit), the ignition timing is retarded to decrease the torque output from the engine 150. The fuel injection amount is calculated by multiplying the current KL by the conversion coefficient (S1160).

Command signals that indicate the calculated throttle valve, ignition timing and fuel injection amount are transmitted to the controller for controlling the opening amount of the throttle valve 112, the ignition timing controller, and the fuel injection amount controller, respectively. This process is periodically executed until the target SA reaches the retardation limit timing. As a result, the target SA is retarded and the torque output from the engine 150 is decreased.

The duration of time until the target SA reaches the retardation limit timing corresponds to the period from time t12 to time t13 in FIG. 6. In this period, the ignition timing is retarded to the retardation limit timing, and the torque generated by the engine 150 is smoothly decreased.

When the target SA reaches the retardation limit timing ("YES" in S1130), the fuel-supply cutoff flag is set and the fuel supply is actually cut off (S1180). The fuel supply is actually cut off at time t13 in FIG. 6.

When the fuel-supply cutoff is started, first, the target KL is decreased to the KL lower limit to decrease the torque output from the engine 150. Then, the target SA is retarded to the retardation limit timing to decrease the torque output from the engine 150. Because the fuel supply is actually cut off after the torque output from the engine 150 is smoothly decreased by a sufficient amount, the amount of a stepwise change in the torque is reduced. Therefore, it is possible to reduce a shock that is caused when the fuel-supply cutoff is started.

When Fuel Supply is Restarted

While the fuel supply is cut off, for example, if the torque required by the driver is equal to or higher than the generable limit torque (lower limit torque), the fuel supply is restarted ("YES" in S2000: S2010). The fuel supply is restarted at time t3 in FIG. 5.

Immediately after the fuel supply is restarted, the control unit according to the embodiment of the invention 4) advances the ignition timing to the base ignition timing to increase the torque, and 5) increase the KL to increase the torque when the ignition timing reaches the base ignition timing.

More detailed description will be provided below with reference to FIG. 7 (and FIG. 4A and FIG. 4B). FIG. 7 is a detailed timing chart that corresponds to the period around time t3 in FIG. 5.

Figure 7:
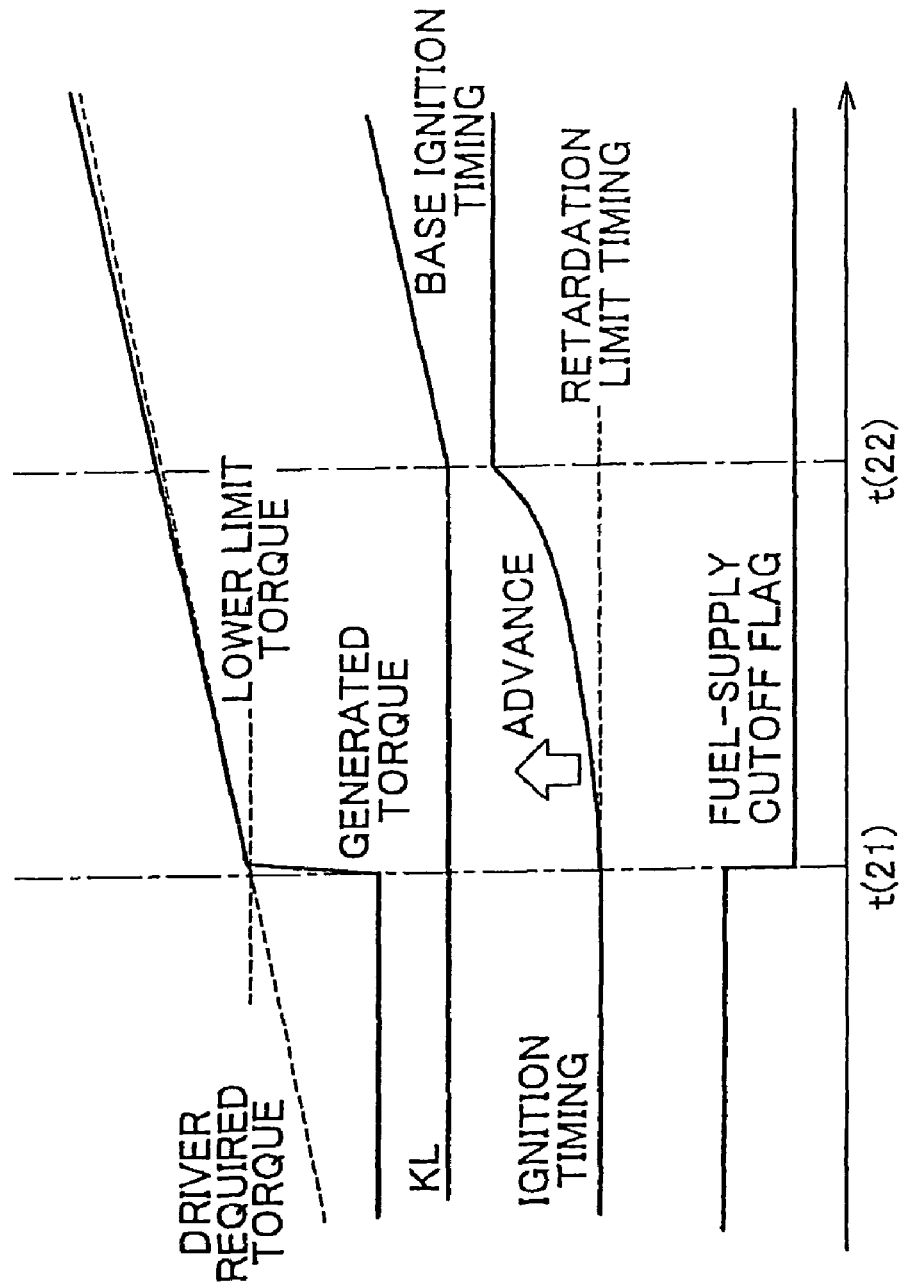
FIG. 7 is a detailed timing chart showing the state, shown in FIG. 5, when the fuel supply is restarted.

In the case where the torque required by the driver when the accelerator pedal is released is set to be equal to or lower than the lower limit torque (generable torque), if the torque required by the driver is equal to or higher than the lower limit torque at time t21 in FIG. 7 ("YES" in S2000), the fuel-supply cutoff flag is reset and the fuel supply to the engine 150 is restarted (S2010). The current KL is detected (S2020), the target torque is calculated by multiplying the ISC target torque by the ignition efficiency (S1020), the engine speed NE is detected (S1030), and the target SA is calculated based on the engine speed NE, the current KL, and the target torque (S1120).

When the target. SA has not reached the base SA ("NO" in S2030), the opening amount of the throttle valve 112 is set to the opening amount that corresponds to the current KL (S2040), and the ignition timing is set to the target SA (S1150). More specifically, first, the ignition timing is advanced with the target KL kept unchanged to increase the torque output from the engine 150. The fuel injection amount is calculated by multiplying the current KL by the conversion coefficient (S1160).

Command signals that indicate the calculated throttle valve opening amount, ignition timing and fuel injection amount are transmitted to the controller for controlling the opening amount of the throttle valve 112, the ignition timing controller and the fuel injection amount controller, respectively. This process is periodically executed until the target SA reaches the base ignition timing, and the ignition timing is advanced and the torque output from the engine 150 is increased.

The duration of time until the target SA reaches the base SA corresponds to the period from time t21 to time t22 in FIG. 7. In this period, the ignition timing is advanced from the retardation limit timing to the base SA, and the torque generated by the engine 150 is smoothly increased.

Next, when the target SA reaches the base SA ("YES" in S2030), the target KL is calculated based on the target torque, the engine speed and the MBT (S1040). The opening amount of the throttle valve 112 is set to the opening amount that corresponds to the target KL (S1060), and the ignition timing is set to the base ignition timing (S1070). More specifically, after the ignition timing is advanced to the base ignition timing to smoothly increase the torque generated by the engine 150 (after the target SA reaches the base SA), the target KL is increased to increase the torque output from the engine 150. The fuel injection amount is calculated by multiplying the current KL by the conversion coefficient (S1090).

Command signals that indicate the calculated throttle valve opening amount, ignition timing and fuel injection amount are transmitted to the controller for controlling the opening amount of the throttle valve 112, the ignition timing controller and the fuel injection amount controller, respectively. This process is periodically executed based on the target KL which corresponds to the torque required by the driver, and the torque output from the engine 150 is increased.

The duration of time in which the target KL is increased and the torque output from the engine 150 increases corresponds to the period after time t22 in FIG. 7. In this period, the ignition timing is maintained at the base ignition timing, and the torque generated by the engine 150 is smoothly increased with an increase in the target KL.

When the fuel supply is restarted, first, the target SA is advanced to the base ignition timing to increase the torque output from the engine 150. Then, the target KL, which corresponds to the torque required by the driver, is increased to increase the torque output from the engine 150. Because the torque output from the engine 150 starts increasing immediately after the fuel supply is restarted and increases smoothly by a sufficient amount, an amount of a stepwise change in the torque is reduced. Therefore, it is possible to reduce a shock that is caused when the torque required by the driver is increased and the fuel supply is restarted. As a result, the driver feels sufficient acceleration feel, which improves the drivability.

The control described so far greatly differs from a non-torque-demand control in which an engine is controlled (for example, the target KL is changed) only based on the depression amount of an accelerator pedal. Under the non-torque-demand control, the target KL changes in accordance with the depression amount of the accelerator pedal, which varies the rate of increase in the torque. As a result, an acceleration shock (when the target KL increases abruptly because the accelerator pedal is depressed suddenly by a large amount) or hesitation (when the target KL increases slowly because the accelerator pedal is depressed gradually by a small amount) may be caused.

In contrast, the control unit according to the embodiment of the invention executes the control described above. That is, A) immediately before start of the fuel-supply cutoff, the control unit 1) decreases the KL to the KL lower limit to decrease the torque, 2) retards the ignition timing to the retardation limit timing to decrease the torque, when the KL reaches the KL lower limit, and 3) actually cuts off the fuel supply when the ignition timing reaches the retardation limit timing. Then, B) immediately after the fuel supply is restarted, the control unit 4) advances the ignition timing to the base ignition timing to increase the torque, and 5) increases the KL to increase the torque when the ignition timing reaches the base ignition timing. Therefore, with the control unit according to the embodiment of the invention, it is possible to minimize a shock that is likely to occur when the fuel-supply cutoff is started, and to minimize an acceleration shock and hesitation that are likely to occur when the fuel supply is restarted in a torque-demand engine control system.

FIRST MODIFIED EXAMPLE

Figure 8:
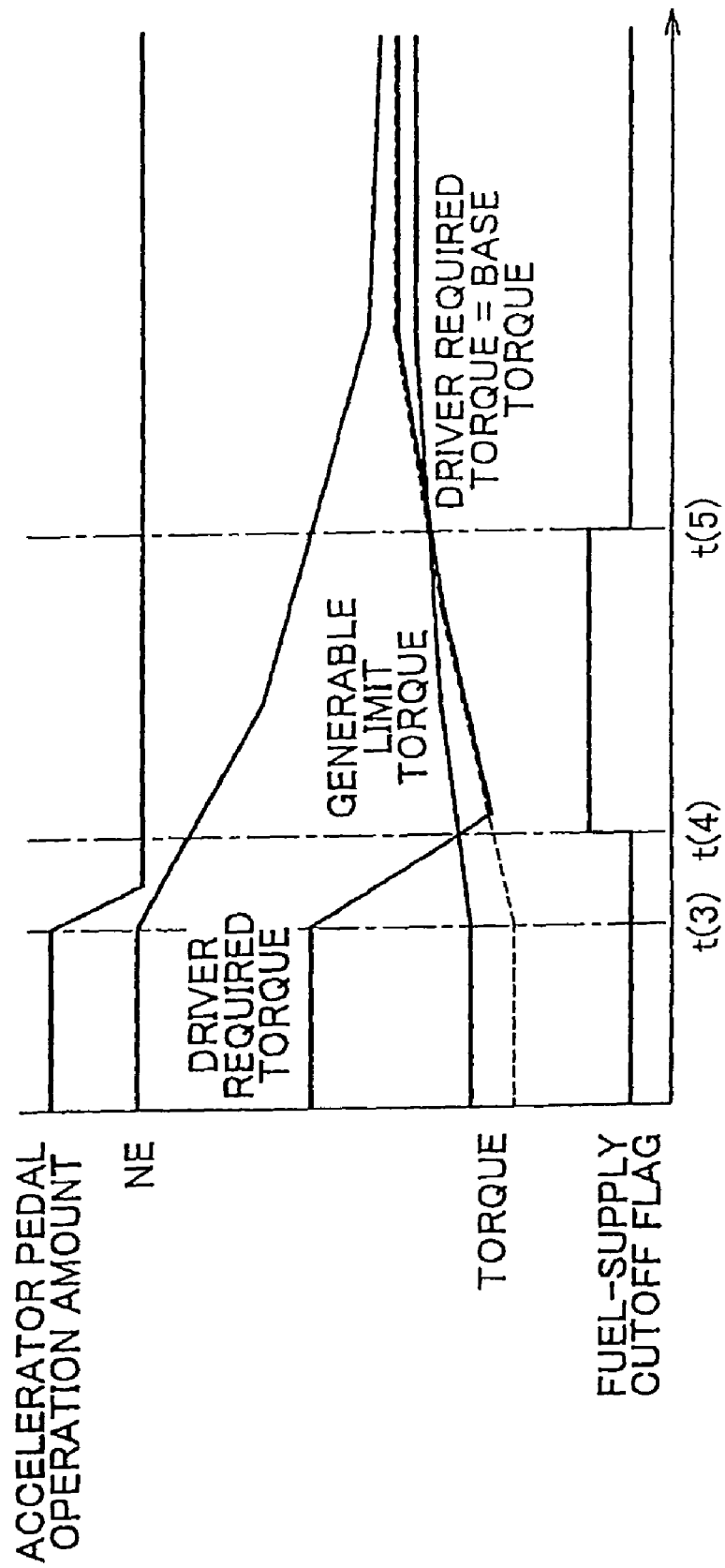
FIG. 8 is a timing chart according to a first modified example of the embodiment of the invention.

Hereafter, a first modified example of the embodiment of the invention will be described with reference to FIG. 8. The first modified example has the following features in addition to the features of the above-described embodiment.

When the accelerator pedal is released, the torque required by the driver is decreased to the base torque. That is, the torque required by the driver is not allowed to fall below the base torque. As shown in FIG. 8; the torque required by the driver matches the base torque.

The generable limit torque (lower limit torque) is set to the torque that is generated at the ignition timing at which the intake efficiency is decreased by the largest amount within a range, in which the fuel injected from the injector 126 is ignited, at the engine speed NE corresponding to the base torque.

When the condition that the torque required by the driver is lower than the generable limit torque is satisfied, the fuel supply is cut off. When the condition that the torque required by the driver is equal to or higher than the generable limit torque is satisfied, fuel supply is restarted.

According to the first modified example, it is possible to minimize a shock that is likely to occur when the fuel-supply cutoff control is started and to minimize an acceleration shock and hesitation that are likely to occur when fuel supply is restarted, as in the embodiment of the invention described above.

SECOND MODIFIED EXAMPLE

Figure 9:
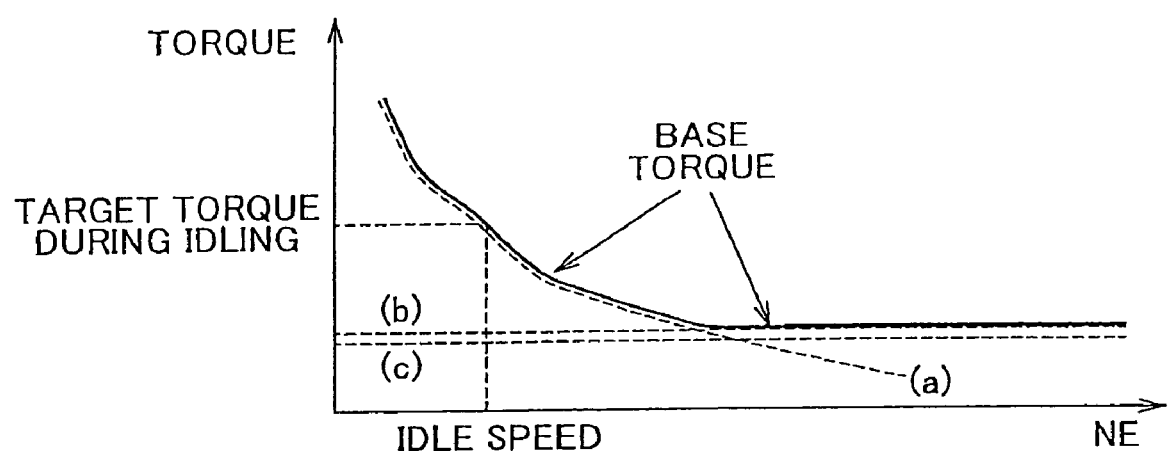
FIG. 9 is a graph showing the base torque according to a second modified example of the embodiment of the invention.

Hereafter, a second modified example of the embodiment of the invention will be described with reference to FIG. 9. The second modified example has the following features in addition to the features of the embodiment of the invention described above.

In the second modified example, the base torque is set to the highest value from among a) the torque determined based on the target idling torque (ISC target torque), b) the torque determined based on the limit amount of fuel injected from the injector 126 (which is the minimum amount of fuel injected from the injector 126 and which is the lower limit of a range in which the linear relationship between the fuel injection duration and the fuel injection amount is established), and c) the torque determined by multiplying the limit of a negative value in an intake pipe (due to consumption of, for example, engine oil) by the most retarded angle (retardation limit).

According to the second modified example, the effects produced by the embodiment of the invention can be obtained. In addition, it is possible to reliably obtain the torque that is determined based on the limit amount of fuel injected from the injector 126 and the torque that is determined by multiplying the limit of a negative value in the intake pipe (due to consumption of, for example, engine oil) by the most retarded angle (retardation limit).

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A controller for a torque-demand-type internal combustion engine mounted in a vehicle, the controller comprising:
   a determination unit that determines that a fuel-supply cutoff for cutting off a fuel supply to the internal combustion engine is allowed to start when a state of the vehicle satisfies a predetermined fuel-supply cutoff start condition; and
   a control unit that executes a torque-demand control using a relationship established among at least an intake efficiency, a torque and an engine rotational speed so as to decrease the torque generated by the internal combustion engine before executing the fuel-supply cutoff, when it is determined that the fuel-supply cutoff is allowed to start, wherein:

the control unit includes an intake efficiency control unit that decreases the intake efficiency of the internal combustion engine to decrease the torque generated by the internal combustion engine by changing the intake efficiency of the internal combustion engine according to a target intake efficiency calculated by a target torque of the internal combustion engine and a current engine rotational speed, and by changing a fuel injection amount according to the changed intake efficiency, until the target intake efficiency reaches a predetermined lower limit value corresponding to a limit range in which the fuel injected from an injector is ignited, and an ignition timing control unit that retards ignition timing of the internal combustion engine to decrease the torque generated by the internal combustion engine, after the intake efficiency of the internal combustion engine is decreased to the lower limit by the intake efficiency control unit; and the control unit further includes a fuel-supply cutoff control unit that controls the internal combustion engine to execute the fuel-supply cutoff after the ignition timing of the internal combustion engine is retarded.

2. The controller according to claim 1, wherein the intake efficiency control unit decreases the intake efficiency to the predetermined lower limit value.

3. The controller according to claim 1, wherein the fuel-supply cutoff control unit controls the internal combustion engine so that the fuel-supply cutoff is executed when the ignition timing of the internal combustion engine is retarded to a retardation limit timing.

4. The controller according to claim 3, wherein the predetermined fuel-supply cutoff start condition is satisfied when a driver does not depress an accelerator pedal while the vehicle is traveling on a downhill slope or when a torque required by the driver is lower than a torque that is generated when the intake efficiency is decreased to the predetermined lower limit value.

5. The controller according to claim 1, wherein the predetermined fuel-supply cutoff start condition is satisfied when a driver does not depress an accelerator pedal while the vehicle is traveling on a downhill slope or when a torque required by the driver is lower than a torque that is generated when the intake efficiency is decreased to the predetermined lower limit value.

6. The controller according to claim 1, wherein the ignition timing control unit retards the ignition timing to a predetermined retardation limit timing.

7. The controller according to claim 1, wherein the ignition timing control unit calculates the ignition timing using an actual intake efficiency.

8. The controller according to claim 2, wherein the predetermined fuel-supply cutoff start condition is satisfied when a driver does not depress an accelerator pedal while the vehicle is traveling on a downhill slope or when a torque required by the driver is lower than a torque that is generated when the intake efficiency is decreased to the predetermined lower limit value.

9. The controller according to claim 2, wherein the fuel-supply cutoff control unit controls the internal combustion engine so that the fuel-supply cutoff is executed when the ignition timing of the internal combustion engine is retarded to a retardation limit timing.

10. The controller according to claim 9, wherein the predetermined fuel-supply cutoff start condition is satisfied when a driver does not depress an accelerator pedal while the vehicle is traveling on a downhill slope or when a torque required by the driver is lower than a torque that is generated when the intake efficiency is decreased to the predetermined lower limit value.

11. A controller for a torque-demand-type internal combustion engine which is mounted in a vehicle and which is suitable for a fuel-supply cutoff control, the controller comprising:

a fuel supply restart control unit that controls the internal combustion engine so that a fuel supply is restarted when a predetermined condition is satisfied while a fuel-supply cutoff for cutting off a fuel supply to the internal combustion engine is executed; and a control unit that executes a torque-demand control using a relationship established among at least an intake efficiency, a torque and an engine speed, the control unit being an electronic control unit, wherein:

the control unit includes an ignition timing control unit that advances ignition timing of the internal combustion engine to increase the torque generated by the internal combustion engine when the fuel supply is restarted, and an intake efficiency control unit that increases the intake efficiency of the internal combustion engine to increase the torque generated by the internal combustion engine after the ignition timing of the internal combustion engine is advanced;

the control unit controls the opening amount of a throttle valve, the ignition timing, and an amount of fuel injected from an injector;

the ignition timing control unit advances the ignition timing to a predetermined reference ignition timing; and the ignition timing control unit calculates the ignition timing using an actual intake efficiency.

12. A method for controlling a torque-demand-type internal combustion engine mounted in a vehicle, comprising:

determining that a fuel-supply cutoff for cutting off a fuel supply to the internal combustion engine is allowed to start when a state of the vehicle satisfies a predetermined fuel-supply cutoff start condition; and executing a torque-demand control using a relationship established among at least an intake efficiency, a torque and an engine rotational speed so as to decrease the torque generated by the internal combustion engine before executing the fuel-supply cutoff, when it is determined that the fuel-supply cutoff is allowed to start, wherein:

in the torque-demand control, the intake efficiency of the internal combustion engine is decreased to decrease the torque generated by the internal combustion engine by changing the intake efficiency of the internal combustion engine according to a target intake efficiency calculated by a target torque of the internal combustion engine and a current engine rotational speed, and by changing a fuel injection amount according to the changed intake efficiency, until the target intake efficiency reaches a predetermined lower limit value corresponding to a limit range in which the fuel injected from an injector is ignited, and ignition timing of the internal combustion engine is retarded to decrease the torque generated by the internal combustion engine after the intake efficiency of the internal combustion engine is decreased to the lower limit; and the internal combustion engine is controlled to execute the fuel-supply cutoff after the ignition timing of the internal combustion engine is retarded.

13. The method according to claim 12, wherein the ignition timing is retarded to a predetermined retardation limit timing when the ignition timing is retarded.

14. The method according to claim 12, wherein the ignition timing is calculated using an actual intake efficiency when the ignition timing is retarded.

15. The method according to claim 12, wherein the predetermined fuel-supply cutoff start condition is satisfied, when a driver does not depress an accelerator pedal while the vehicle is traveling on a downhill slope or when a torque required by the driver is lower than a torque that is generated when the intake efficiency is decreased to the predetermined lower limit value.

16. The method according to claim 12, wherein the internal combustion engine is controlled so that the fuel-supply cutoff is executed when the ignition timing of the internal combustion engine is retarded to a retardation limit timing.

17. The method according to claim 16, wherein the predetermined fuel-supply cutoff start condition is satisfied, when a driver does not depress an accelerator pedal while the vehicle is traveling on a downhill slope or when a torque required by the driver is lower than a torque that is generated when the intake efficiency is decreased to the predetermined lower limit value.

18. The method according to claim 12, wherein the intake efficiency is decreased to the predetermined lower limit value when the intake efficiency is decreased.

19. The method according to claim 18, wherein the internal combustion engine is controlled so that the fuel-supply cutoff is executed when the ignition timing of the internal combustion engine is retarded to a retardation limit timing.

20. The method according to claim 19, wherein the predetermined fuel-supply cutoff start condition is satisfied, when a driver does not depress an accelerator pedal while the vehicle is traveling on a downhill slope or when a torque required by the driver is lower than a torque that is generated when the intake efficiency is decreased to the predetermined lower limit value.

21. The method according to claim 18, wherein the predetermined fuel-supply cutoff start condition is satisfied, when a driver does not depress an accelerator pedal while the vehicle is traveling on a downhill slope or when a torque required by the driver is lower than a torque that is generated when the intake efficiency is decreased to the predetermined lower limit value.

22. A method for controlling a torque-demand-type internal combustion engine which is mounted in a vehicle and which is suitable for a fuel-supply cutoff control, comprising:
controlling the internal combustion engine so that a fuel supply is restarted when a predetermined condition is satisfied while a fuel-supply cutoff for cutting off a fuel supply to the internal combustion engine is executed by an electronic control unit; and
executing a torque-demand control using a relationship established among at least an intake efficiency, a torque and an engine speed, wherein:
in the torque-demand control, when the fuel supply is restarted, ignition timing of the internal combustion engine is advanced to increase the torque generated by the internal combustion engine;
the electronic control unit controls the opening amount of a throttle valve, the ignition timing, and an amount of fuel injected from an injector;
the intake efficiency of the internal combustion engine is increased to increase the torque generated by the internal combustion engine after the ignition timing of the internal combustion engine is advanced;
the ignition timing is advanced to predetermined reference ignition timing when the ignition timing of the internal combustion engine is advanced; and
in the torque-demand control, the ignition timing is calculated using an actual intake efficiency.

* * * * *